United States Patent Office 3,600,194
Patented Aug. 17, 1971

3,600,194
METHOD OF PREPARING FERMENTED SAUSAGE PRODUCTS
Richard D. Trelease, Downers Grove, Ill., and Cleo A. Rinehart, Boone, Iowa, assignors to Swift & Company, Chicago, Ill.
No Drawing. Filed Oct. 21, 1968, Ser. No. 769,362
Int. Cl. A22c 11/00
U.S. Cl. 99—109                                6 Claims

ABSTRACT OF THE DISCLOSURE

Sweet-sour flavored sausage products and an improved method of controlling the characteristic sweet-sour flavor by incorporating sufficient fermentable sweeteners to produce the desired tangy or sour flavor when fermented, and sufficient artificial nonfermentable sweeteners to produce the desired sweet flavor in the final product.

---

The present invention relates generally to a method of producing the sweet-sour flavored sausage and the resulting sausage compositions. More specifically it relates to a method of controlling the sweet-sour flavor of sausage by incorporating only that amount of fermentable sweeteners required to produce the desired sour or tangy flavor when fermented and that amount of nonfermentable sweetener to produce the sweet flavor in the final product.

The making of sausage is an ancient art going back several centuries. It was practiced long before the actual process was well understood. Even today there is only limited scientific information available regarding the manufacture of dry sausage. Heretofore, in the manufacture of certain sausage, bacteria are permitted to ferment the natural sugar content of the sausage ingredients and to develop the desired degree of acidity. This fermentation process results in the desired flavor characteristics and tanginess. The desired degree of acidity or tangy (sour) flavor may be regulated by limiting the amount of sugar to that which will produce the desired tangy flavor when acted upon or fermented by the bacteria. In other sausages, such as those having a sweet-sour flavor, it is desirable to have excess sugar present which will produce the desired sweet flavor. Obviously it is very difficult to know exactly when to stop the bacterial fermentation in order to insure absolute uniformity in the sweet-sour flavor of such sausage. Examples of sweet-sour types of sausage which this invention is applicable, are: Lebanon bologna, genoa, Thuringer, salami, farmer, holsteiner, smoked dried salami, cervelat, Italian unsmoked salami, chorizos, mortadella, soft cervelat, cooked salami, and peperoni, etc.

It is therefore a primary object of this invention to provide an improved method of producing a more uniform sweet-sour flavor in sausage products.

It is another object of this invention to provide an improved method of controlling the acidity of sausage products by limiting the fermentable sweeteners within sausage ingredients to that amount which, when substantially completely fermented by bacterial action, will produce the desired tangy flavor.

It is a further object of this invention to provide an improved method of producing the desired sweetness in sweet-sour type sausage by incorporating sufficient nonfermentable sweeteners to produce the desired sweetness in the final product.

It is, yet, a further object of this invention to provide a sweet-sour flavored sausage in which the fermentable sweeteners produce the desired tangy flavor and the nonfermentable sweeteners produce the sweet flavor.

Other objects and advantages of the present invention will be apparent from a further reading of the specification and appended claims.

We have discovered in the production of sweet-sour sausage that greater control and uniformity of the flavor is obtained when substantially all the added fermentable sweeteners are allowed to ferment and to produce the desired tangy flavor, and the sweet flavor is produced by the addition of nonfermentable sweeteners.

In preparing sweet-sour sausage, bacterial fermentation is one of the essential steps of the process. Among other things it plays an important role in the development of a characteristic flavor that is typical for this sausage and it also lowers the pH which both prolongs the shelf-life of the product and produces a firm texture. One of the desirable flavor characteristics produced is the tangy or acid flavor that results from the production of acid during the bacterial fermentation of the fermentable sweeteners; such as any suitable sugar or combination thereof.

Historically sufficient fermentable sweetener such as sugar and/or dextrose have been added to the sausage ingredients to produce both the desired acid and the remaining or unfermented sugar to create the desired sweet taste. Obviously, it is difficult to arrange a process that will stop the fermentation of the sweetener at just the right point to produce the desired uniformity of flavor. For example, the bacterial action in the processing of Lebanon bologna is stopped by raising the temperature of the sausage, at just the proper point, to destroy the fermenting bacteria. In the processing of Genoa type sausage the fermenting bacteria are destroyed by the build up of the salt content, the evaporation of the water content, and the lowering of the pH which results from the fermentation or bacterial action of the fermentable sweetener. The degree of sweetness and sourness in the end product is influenced by several factors such as:

(1) the initial "concentration" of bacteria in the sausage ingredients,
(2) the type of bacteria employed,
(3) the temperature of the sausage ingredients during processing,
(4) the moisture content of the sausage ingredients,
(5) the amount of smoke employed, and
(6) the size of the casing.

In the present invention, the above difficulties can be avoided by processing sufficient quantities of any suitable fermentable sweeteners, such as dextrose or sucrose or mixtures thereof, to permit the optimum amount of fermentation and sufficient nonfermentable sweetener to produce the desired sweet flavor. Examples which are illustrative of nonfermentable sweeteners found to be useful in this process are: the cyclamates known also as sucaryls; such as, calcium cyclamate (cyclohexyl sulfamate), magnesium cyclamate (magnesium cyclohexyl sulfamate), potassium cyclamate (potassium cyclohexyl sulfamate), sodium cyclamate (sodium cyclohexyl sulfamate); saccharin and salts thereof: such as, ammonium, sodium and calcium, and mixtures thereof. Generally, the fermentable sweeteners will be present in an amount of between about .5% to about 4%, preferably about .75% to about 3.5% based on the total weight of the meat while the nonfermentable sweeteners will be present in an amount of between about .001% to about .2%, preferably about .01% to about .15%, also based on the total weight of the meat.

The following examples are given to illustrate the invention in greater detail, but it is to be understood that examples are given primarily by way of example, rather than by way of limitation, except as set forth in the claims.

EXAMPLE I

Lebanon bologna

- 100 lbs.—Cow meat
- 3½ lbs.—Salt
- 1¾ lbs.—Sucrose
- 0.8 oz.—Calcium cyclamate
- ¼ oz.—Sodium nitrate
- ¼ oz.—Sodium nitrite
- ½ lb.—Spices The meat was ground and blended with other materials and then stuffed into 4" casings. The sausage ingredients were held for 1½ days at 85° F. in order for the proper acidity development to occur. Next the sausage was put in a smoke house and held until the internal temperature reached 130° F. thereby assuring the pasteurization of the sausage. When the sausage was tested for flavor it had a noticeable tang and the desirable sweetness.

EXAMPLE II

Genoa sausage

- 100 lbs.—Pork
- 3½ lbs.—Salt
- 1 lb.—Dextrose
- ¼ oz.—Sodium nitrate
- ¼ oz.—Sodium nitrate
- ½ lb.—Spices
- 0.4 oz.—Sodium cyclamate The above ingredients were comminuted and blended together. They were then stuffed into 3½" casings and held 2 days at 68° F. to permit the proper bacterial fermentation to take place. The sausage was next held in a dry room at a temperature of about 50° F. for 73 days. It was tested and found to have the proper acidity development and also had a slight characteristic sweetness.

EXAMPLE III

Thuringer sausage

- 100 lbs.—Cow meat
- ¾ lb.—Dextrose
- ¾ lb.—Sucrose
- 2.0 g.—Saccharin
- 3½ lbs.—Salt
- ¼ oz.—Sodium nitrate
- ¼ oz.—Sodium nitrate
- ¾ lb.—Spices
- 1 oz.—Culture of pediococcus bacteria The meat was ground and blended with the other materials and stuffed into casings. It was held one day at about 105° F. and then put into the smoke house until an internal temperature of about 130° F. was attained. At this point the desirable tang had been developed and the characteristic sweetness still was present.

EXAMPLE IV

Salami

- 70 lbs.—Beef
- 30 lbs.—Pork
- 3½ lbs.—Salt
- ½ g.—Saccharin
- .1 oz.—Calcium cyclamate
- ½ lb.—Dextrose
- ½ lb.—Sucrose
- ¼ oz.—Sodium nitrite
- 2 lbs.—Spices The above ingredients were ground and mixed and stuffed into 2" diameter casings and held 2 days at 65° F. to permit proper fermentation to take place. It was then smoked and heated to 130° F. The sausage was next held in a dry room at about 55° F. for 40 days. It was tested and found to have the proper acidity development and a slight characteristic sweetness.

EXAMPLE V

Peperoni

- 70 lbs.—Pork
- 30 lbs.—Beef
- 3½ lbs.—Salt
- 1 lb.—Dextrose
- ⅛ oz.—Sodium nitrite
- 1 lb.—Spices
- .3 oz.—Sodium cyclamate The meat was comminuted and blended with the other ingredients and stuffed into 38–40 mm. casings. The sausage was held at 82° F. for 40 hours and then heated to 120° F. It was then placed in a dry room at 49° F. and held for 19 days. It was then tested and found to have the desirable balance between tang and sweetness.

EXAMPLE VI

Holsteiner

- 100 lbs.—Pork
- 3⅓ lbs.—Salt
- 1½ lbs.—Dextrose
- 1 g.—Saccharin
- ½ lb.—Spices The meat was comminuted, blended with the other ingredients and stuffed into 44 mm. beef round casings. The sausage was then held at 68° F. for 1½ days and then smoked at 105° F. and then transferred to the dry room for 40 days. At the end of this time it was tested and found to have the proper acidity and sweetness for the product.

EXAMPLE VII

Farmer

- 50 lbs.—Beef
- 50 lbs.—Pork
- 1 lb.—Sucrose
- 2 ozs.—Calcium cyclamate
- 1¾ lbs.—Spice
- 3½ lbs.—Salt The meat was comminuted, blended with the remaining ingredients and stuffed into 3" Brechteen casings. It was then held 2½ days at 60° F. It was then smoked and cooked to 140° F. and placed in the dry room for 14 days. At this time it had the proper balance between sourness and sweetness.

Obviously, many modifications and variations of the invention as hereinbefore set forth may be made without departing from the spirit and scope thereof, and therefore only such limitations should be imposed as are here indicated by the appended claims.

We claim:

1. In the preparation of fermented sweet-hour sausage products, the improvement comprising: blending into sausage ingredients from about 0.5% to about 4% by weight of the meat of a fermentable sweetener and from about 0.001% to about 0.2% by weight of the meat of a non-fermentable sweetener, and holding the blended ingredients for a time sufficient to enable the fermentable sweetener to produce the desired tangy flavor and the non-fermentable sweetener to produce the desired sweet flavor in the final product.

2. The method of claim 1 wherein the fermentable sweeteners are natural sugars or combinations thereof.

3. The method of claim 1 wherein the non-fermentable sweetener is selected from the group consisting of cyclamates, saccharins, and mixtures thereof.

4. The method of claim 1 wherein the sweet-sour sausage products are selected from the group consisting of Genoa, Thuringer, cervelat, Italian unsmoked salami, chorizos, peperoni, mortadella, soft cervelat, cooked salami, farmer, holsteiner, salami and Lebanon bologna.

5. The method of claim 1 wherein the amount of fermentable sweeteners is from about 0.75% to about 3.5% by weight of the meat and the amount of the non-fermentable sweeteners is from about 0.01% to about 0.15% by weight of the meat.

6. The fermented product produced in accordance with the method of claim 1.

References Cited

UNITED STATES PATENTS

| | | | |
|---|---|---|---|
| 2,907,661 | 10/1959 | Niven et al. | 99—109 |
| 2,946,692 | 7/1960 | Kahn et al. | 99—109X |
| 3,117,869 | 1/1964 | Sims | 99—109 |

HYMAN LORD, Primary Examiner